United States Patent
Thomas

(10) Patent No.: US 12,378,457 B2
(45) Date of Patent: *Aug. 5, 2025

(54) PALLET STABILIZATION ADHESIVE

(71) Applicant: Bio-Bond LLC, Peosta, IA (US)

(72) Inventor: Richard W. Thomas, Asbury, IA (US)

(73) Assignee: BIO-BOND, LLC, Peosta, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,314

(22) Filed: Nov. 27, 2023

(65) Prior Publication Data

US 2024/0093077 A1    Mar. 21, 2024

Related U.S. Application Data

(63) Continuation of application No. 18/005,496, filed as application No. PCT/US2021/041587 on Jul. 14, 2021, now Pat. No. 11,827,817.

(60) Provisional application No. 63/052,088, filed on Jul. 15, 2020.

(51) Int. Cl.
    *C09J 189/06*    (2006.01)

(52) U.S. Cl.
    CPC ................... *C09J 189/06* (2013.01)

(58) Field of Classification Search
    CPC ...................................... C09J 189/06
    See application file for complete search history.

(56) References Cited

U.S. PATENT DOCUMENTS

| 5,589,528 | A | 12/1996 | Bogardy |
| 2004/0166238 | A1 | 8/2004 | Nowicki et al. |
| 2007/0281003 | A1 | 12/2007 | Fuisz et al. |
| 2014/0144579 | A1 | 5/2014 | Brown et al. |
| 2023/0279280 | A1 | 9/2023 | Thomas |

FOREIGN PATENT DOCUMENTS

| DE | 10261786 | | 7/2004 |
| EP | 1462499 | A1 | 9/2004 |
| WO | 2014163916 | A1 | 10/2014 |
| WO | WO2020163429 | | 8/2020 |
| WO | WO2021158687 | | 8/2021 |
| WO | WO2022015824 | | 1/2022 |

*Primary Examiner* — Liam J Heincer
(74) *Attorney, Agent, or Firm* — Cislo & Thomas, LLP

(57) ABSTRACT

A biodegradable adhesive containing effective amounts of water; defoamer; gelatin; preservative; glycerin, sorbitol, or a mixture of glycerin and sorbitol; NaCl; and sugar for use in making boxes, and other material, in which the material is recyclable, repulpable, compostable, and the like to improve environmentally friendly packaging and eliminating hazards of using hot adhesives.

12 Claims, No Drawings

PALLET STABILIZATION ADHESIVE

SUMMARY

This application is a continuation application of U.S. patent application Ser. No. 18/005,496, filed Jan. 13, 2023 (now U.S. Pat. No. 11,827,817), which is a national stage filing of PCT Application No. PCT/US2021/041587, filed Jul. 14, 2021, which claims priority to U.S. Provisional Patent Application No. 63/052,088, filed Jul. 15, 2020, which applications are incorporated by reference herein in their entirety.

Disclosed are natural based biodegradable adhesives. By being biodegradable, the these adhesives allow the materials with which they are used to be recyclable, repulpable and/or compostable, which can substantially increase the value of such materials once used, as well as provide a more green and more environmentally sustainable repurposing of the used materials. These adhesives solve "stickies" (defined Wikipedia) paper packaging waste stream hydro-pulper related recycling problems that cause paper web breaks and paper blemishes.

In particular, disclosed is a repulpable organic based biodegradable pallet stabilization adhesive. Application of the adhesive to boxes adheres the boxes to each other on a pallet and minimizes or eliminates the need for plastic stretch wrap or other pallet protection systems and has the potential to reduce global use of plastic stretch wrap by as much as 50-100%. Application of the adhesive to paper and other various substrates (films, foils, etc.) and packaging (corrugated box, various types of pet food, bird feed seed, food products, etc., but not limited to) causes a more stable pallet load by securing packages together via anti-slip characteristic properties, preventing products from moving during transport, therefore minimizing damage. In some cases, bar code obstruction problems are eliminated. The adhesive is a natural gelatin (gelatine) based biodegradable adhesive as a substitute or replacement for non-biodegradable non-organic synthetic resin emulsion-based adhesives (aka, "synthetic glues"), various starch/emulsion blends, and/or dextrin/emulsion blends, and/or hot melt pallet stabilization adhesives. The adhesive is plastic free and wax free.

The adhesive promotes global plastic percentages contained in packaging reduction & advances worker safety by eliminating serious hot melt skin burns!

Various aspects adhesives and applications described below can be combined in different manners to create different embodiments.

The adhesive can include water, pure or various blends of gelatins, glycerin, refined sugar, sugar substitutes, defoamer, urea, sodium chloride, fragrance and preservative.

DETAILED DESCRIPTION

Formulae for the adhesive include:

|  | % (Parts) |
|---|---|
| Water: | 10-51 |
| Defoamer: | 0-1.5 |
| Gelatin: | 0-24 |
| Preservative: | 0-1 |
| Glycerin, sorbitol, and/or sorbitol solutions and/or a mixture of glycerin, sorbitol and/or sorbitol solutions: | 0-22 |
| NaCl: | 0-9 |
| Sugar: | 20-61 |
| Vanilla Extract: | 0-1 |
| Total Parts: | 100.00% |
| and | |
| Water: | 30.43 ± 10% |
| Defoamer: | .67 ± 10% |
| Gelatin: | 13.50 ± 10% |
| Preservative: | .40 ± 10% |
| Glycerin, sorbitol, and/or sorbitol solutions and/or a mixture of glycerin, sorbitol and/or sorbitol solutions: | 12.00 ± 10% |
| NaCl: | 2.00 ± 10% |
| Sugar: | 41.00 ± 10% |
| Vanilla Extract: | .27 ± 10% |
| Total Parts: | 100.00% |
| and | |
| Water: | 30.43 ± 5% |
| Defoamer: | 67 ± 5% |
| Gelatin: | 13.50 ± 5% |
| Preservative: | .40 ± 5% |
| Glycerin, sorbitol, and/or sorbitol solutions and/or a mixture of glycerin, sorbitol and/or sorbitol solutions: | 12.00 ± 5% |
| NaCl: | 2.00 ± 5% |
| Sugar: | 41.00 ± 5% |
| Vanilla Extract: | .27 ± 5% |
| Total Parts: | 100.00% |
| and | |
| Water: | 30.43 ± 2% |
| Defoamer: | .67 ± 2% |
| Gelatin: | 13.50 ± 2% |
| Preservative: | .40 ± 2% |
| Glycerin, sorbitol, and/or sorbitol solutions and/or a mixture of glycerin, sorbitol and/or sorbitol solutions: | 12.00 ± 2% |
| NaCl: | 2.00 ± 2% |
| Sugar: | 41.00 ± 2% |
| Vanilla Extract: | .27 ± 2% |
| Total Parts: | 100.00% |
| and | |
| Water: | 30.43 |
| Defoamer: | .67 |
| Gelatin: | 13.50 |
| Preservative: | .40 |
| Glycerin, sorbitol, and/or sorbitol solutions and/or a mixture of glycerin, sorbitol and/or sorbitol solutions: | 12.00 |
| NaCl: | 2.00 |
| Sugar: | 41.00 |
| Vanilla Extract: | .27 |
| Total Parts: | 100.00% |

The water can be made up of distilled water that has both contaminants and minerals removed, and/or other types of purified filtered water that have chemicals and contaminants removed, but may still contain minerals.

The gelatins can include, but are not limited to, blends of amber and opaque colored inedible porcine-based, bovine-based, bone-based, fish-based, and/or poultry-based collagen-based gelatins, and can also include pharmaceutical and edible gelatins, as well as other gelatins. The gelatins can be presented in various forms, including as granulated, noodles, dust, natural colored hard-shell pharmaceutical capsule gelatin tailings, ground multi-colored hard-shell pharmaceutical capsule gelatin tailings, and various pharmaceutical soft gelatin encapsulation web netting encapsulation waste gelatin tailings blends. In an embodiment, the gelatins have a bloom gel strength value between 20-500 bloom at a 6.67% solution, tested under typical & customary gelatin industry laboratory test conditions.

The glycerin can include 99.7% USP Kosher Grade, as well as lesser quality and lower priced grades, including 96.0% technical grade and 88% crude grade. As a substitute for glycerin, sorbitol and/or sorbitol solutions can be used, and/or a mixture of glycerin, sorbitol and/or sorbitol solutions. The defoamer can be Solvay USA defoamer. The preservative prevents mold. Vanilla extract or other fragrance can be added to provide a pleasant odor. All of the components can be provided in edible or modified to be edible functional purpose versions forms to make an entirely edible product.

In the above adhesive formulae, the sugar component can be sugar, any type of corn syrup, including high fructose corn syrup, a mixture of sugar and corn syrup and/or can include other substitutes. The sugar can be refined sugar, for example from sugar cane or beets, or can be any sucrose/ fructose blend.

The color of these adhesives is typically a semi translucent gelatin color.

Also, the natural biodegradable glycerin in the composition lubricates adhesive supply unit components, including O-rings.

The specific percentages of components can be adjusted as necessary depending on a specific use and desired characteristic. All values and ranges within the given ranges are intended to be part of the invention. Other alternatives can also be provided by varying the percentages of components. One or more of the components can be omitted in alternative adhesive embodiments.

The adhesive is plastic free and wax free and reduces plastic stretch wrap usage. The adhesive can be used by itself, or together with stretch wrap. It helps prevent packages from shifting during transportation, by reason of green, eco-friendly bond shear strength.

The adhesive sticks substrates by losing water into the substrates and cooling (loss of temperature, applied at approximately 140° F./60° C. It applies at approximately 50% cooler temperature as compared to typical and customary hot melt synthetic glue pallet stabilization adhesives and therefore is safer than hot melt biodegradable pallet stabilization adhesive.

The adhesive is recommended for use on various types of corrugated and solid fiberboard paper box substrates, chilled and frozen packaging substrates, pre-printed and post printed substrates, barrier coated substrates, high-gloss coated substrates, UV coated substrates, high gloss with other coatings substrates, various bags and substrates, printed kraft, kraft, white, multi-walled bags, printed graphics boxes, kraft boxes, brown multi-walled bags, frozen containers, folding cartons (SBS, SUS & CCNB coated substrates), corrugated boxes (i.e., RSC, Gaylord, Bliss, Telescopic, etc.), recycled, virgin, high end printed and calendared substrate surfaces to reduce global plastic stretch wrap use.

The adhesive can be gently gravity filtered through a twin 200-micron & 55-micron filter bag system. This adhesive can be produced in food processing hemispherical bottom mixing kettles (super-mix, no mix dead spots), which provide superior mixing as compared to conventional adhesive production kettles having cone shaped or flat bottoms.

The adhesive can be applied by various forms of spraying, swirl spraying, extruded dots, stitches, beads, etc. This can include but not be limited to modified hot melt automatic 55-gallon drum tank unloader and adhesive supply units, heated stainless-steel hoses, and heated corrosion resistant glue extrusion heads (helical arc swirl spray, spray, beads, stitches, dots, etc.), to stabilize substrates with shear strength to reduce plastic stretch wrap use.

Existing adhesive application equipment may need to be modified with various stainless-steel parts to accommodate corrosive water presence (i.e., use of stainless-steel types of pumps, screws, modified lids for water drip-down evaporation, valves, heads and nozzles, etc.). Valco/Melton of Cincinnati is a market leader in corrugated adhesives application equipment, and has tested and approved the basic adhesive in their adhesive application equipment.

The adhesive provides for minimal to no fiber tear.

As advantages, the adhesives are biodegradable and freeze/thaw stable. That is, the adhesive can go through freeze/thaw cycles without substantive degradation. This means that the adhesive does not need to be shipped by heated trucks during winter conditions, a substantial cost savings, and/or, can be shipped year-round, and not just during warmer months. In addition, the adhesive has easy clean-up properties with hot water, generally up to 160° F. No solvents or caustic chemical cleaners are required.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context. Various features of the various embodiments disclosed herein can be combined in different combinations to create new embodiments within the scope of the present disclosure. Any ranges given herein include any and all specific values within the range and any and all ranges within the given range. Various components of the various formulae can be omitted, as well. Embodiments can be limited to the components disclosed, and to exclude other active components, and/or to exclude other components entirely. To the extent that "about" or "substantively" is used to modify a value, that value is rendered as ±10% and ±2% of the value, respectively, unless otherwise stated.

Any and all information disclosed in the attached Appendix is incorporated by reference herein.

FURTHER INFORMATION ON SPECIFIC EMBODIMENTS

TECHNICAL DATA SHEET: (Date: 7-12-2020): BIO-BOND 710 GREEN HYBRID-MELT

Viscosity Specification: 600 cps., +/−500 cps., W/0% Dilution @ 700 C #2 @ 20 RPM's BROOKFIELD RVT Viscometer Refracted Solids %: 65.5%+/−5.5%

Odor: Pleasant, mild vanilla.

Color: Typical gelatin/gelatine.

Recommended Application Temperature: 660 C-710 C (1500 F-1580 F, could vary slightly)

Shelf-Life: Stored properly in a cool dry environment, 24-months.

Water Clean-Up: WARM-HOT WATER ONLY.

Packaging: 55-Gallon plastic drums. For use with automatic 55-gallon hot melt adhesive drum unloader (modified for lower temperatures and water-based adhesive), but not limited to other packaging formats.

Description: Water-Based Natural Biopolymer & Plant-Based blend adhesive solids repulpable PALLET STABILIZATION ADHESIVE TO REDUCE PLASTIC STRETCH WRAP USE! Approved for use as a FOOD PACKAGING ADHESIVE under Code of Federal Regulations, Title 21, C.F.R. 175.105.

SAFETY DATA SHEET:
BIO-BOND 710
Date: Jul. 12, 2020
SECTION 1: PRODUCT AND COMPANY IDENTIFICATION
Product Name: BIO-BOND 710
Synonyms: Jelly Glue
SECTION 2: HAZARDOUS IDENTIFICATION
INGREDIENTS: Proprietary Composition
This product is considered to be NON-HAZARDOUS and does not contain any hazardous substance in any amount that requires reporting.
SECTION 3: COMPOSITION AND INFORMATION ON INGREDIENTS
EMERGENCY OVERVIEW:
PHYSICAL STATE: Solid Gel
COLOR: Typical gelatin/gelatine (varies dues to collagen sourcing).
ODOR: Vanilla
ROUTES OF ENTRY: Inhalation, skin and eye contact
POTENTIAL HEALTH EFFECTS:
EYES: Vapor that is released from this product when heated may cause mild eye irritation.
SKIN: Contact may cause mild skin irritation.
INGESTION: Ingestion is not an anticipated route of exposure for this product in industrial use.
INHALATION: Vapors and/or aerosols may be formed at elevated temperatures. Inhalation of these may cause slight irritation to the respiratory tract (nose, throat and lungs).
CARCINOGENICITY: This product does not contain 0.1% or more of any carcinogenic chemicals listed by the International Agency for Research on Cancer (IARC), the National Toxicology Program (NTP) or regulated by the U.S. Occupational Safety and Health Administration (OSHA) as a carcinogen.
ALLERGEN: This product contains no known allergens.
SECTION 4: FIRST AID MEASURES:
EYES: Flush eyes with clean water. Seek medical attention as needed.
SKIN: Flush skin with clean water. Remove contaminated clothing. Seek medical attention if irritation develops or persists. Wash contaminated clothing before reuse.
INGESTION: Do NOT induce vomiting. Give the victim one or two glasses of water or milk to drink. Never give anything mouth to an unconscious person. Seek medical attention.
INHALATION: Remove affected individual(s) to fresh air. Seek medical attention if breathing difficulty develops.
SECTION 5: FIRE-FIGHTING MEASURES:
FLAMMABLE LIMITS IN AIR (% BY VOLUME):
UPPER: Not Applicable
LOWER: Not Applicable
FLASHPOINT: >212° F. (100° C.)
AUTOIGNITION TEMPERATURE: Not Applicable
NFPA HAZARD CLASSIFICATION:
HEALTH: 1 FLAMMABILITY: 0 REACTIVITY: 0
HMIS HAZARD CLASSIFICATION:
HEALTH: 1 FLAMMABILITY: 0 REACTIVITY: 0
EXTINGUISHING MEDIA: Use Carbon Dioxide or dry chemical for small fires, aqueous foam or water for large fires.
Water may be used to cool tanks and structures adjacent to the fire.
SPECIAL FIRE FIGHTING PROCEDURES: Wear self-contained breathing apparatus (SCBA) and full fire-fighting protective clothing. Thoroughly decontaminate all protective equipment after use.
UNUSUAL FIRE AND EXPLOSION HAZARDS: No special fire and explosion hazards are associated with this product. This product will not burn unless it is evaporated to dryness.
HAZARDOUS COMBUSTION PRODUCTS: Combustion may produce Carbon Monoxide, Carbon Dioxide and irritating or toxic vapors and gases.
SECTION 6: ACCIDENTAL RELEASE MEASURES:
Dike if necessary, contain spill with inert sorbent. Sweep spilled product and transfer to containers for disposal, as per local regulations. Keep spilled products out of sewers, watersheds or water systems. No adverse health effects expected from the clean-up of spilled product. Follow personal protective equipment recommendations found in Section 8 of this Safety Data Sheet.
SECTION 7: HANDLING AND STORAGE:
HANDLING: Avoid inhalation and contact with eyes, skin and clothing. Wash hands thoroughly after handling and before eating or drinking. Remove and wash contaminated clothing before reuse. Use with adequate ventilation.
STORAGE: Store at room temperature (68°-84° F. [20°-29° C.) in a well ventilated area. Protect product from contamination and dry-out.
SECTION 8: EXPOSURE CONTROLS/PERSONAL PROTECTION:
EXPOSURE GUIDELINES: There is no U.S. Occupational Safety and Health Administration (OSHA) Permissible Exposure Limits (PEL) or American Conference of Governmental Industrial Hygienists (ACGIH) Threshold Limit Values (TLV) or Short Term exposure Limits (STEL) established for the component(s) of this product.
ENGINEERING CONTROLS: Use general ventilation to maintain airborne concentrations to levels that are below regulatory and recommended occupational exposure limits. Local ventilation may be required during certain operations.
RESPIRATORY PROTECTION: Use a respirator if general room ventilation is not available or sufficient.
EYE PROTECTION: Wear safety glasses when handling this product.
SKIN PROTECTION: Not normally required. Wear chemically resistant gloves to prevent prolonged or repeated contact.
SECTION 9: PHYSICAL AND CHEMICAL PROPERTIES:
PHYSICAL STATE: Solid Gel
COLOR: Typical gelatin/gelatine, (varies due to collagen sourcing).
ODOR: Vanilla
SOLUBILITY IN WATER: Soluble
BOILING POINT: >212° F. (>100° C.) Water
FREEZING POINT: <32° F. (<0° C.) Water
VAPOR DENSITY (mmHg): N/A DENSITY: 1.19
SECTION 10: STABILITY AND REACTIVITY:
STABILITY: This product is stable during storage and its intended use.
CHEMICAL INCOMPATIBILITY: No incompatibilities have been identified.
HAZARDOUS DECOMPOSITION PRODUCTS: Thermal decomposition may form Carbon Monoxide, Carbon Dioxide, and various Hydrocarbons.
HAZARDOUS POLYMERIZATION: Hazardous polymerization will NOT occur.
CONDITIONS TO AVOID: Extreme heat, temperatures >110° F. (43° C.)
SECTION 11: TOXICOLOGICAL INFORMATION:
EYE: No information is available.
SKIN: No information is available.
INHALATION: No information is available.
ORAL: No information is available.
CHRONIC/CARCINOGENICITY: This product does not contain 0.1% or more of any carcinogenic chemicals listed by the International Agency for Research on Cancer (IARC), the National Toxicology Program (NTP) or regulated by the U.S. Occupational Safety and Health Administration (OSHA) as a carcinogen.
SECTION 12: ECOLOGICAL INFORMATION:
ECOLOGICAL INFORMATION: No information is available.
SECTION 13: DISPOSAL CONSIDERATIONS:
WASTE DISPOSAL METHOD: Not a RCRA hazardous waste. Disposal of this product is not regulated under RCRA. Dispose of in an approved landfill. Consult your state, local or provincial authorities and your local waste vendor for more restrictive requirements.
RCRA HAZARD CLASS: NOT A RCRA HAZARDOUS WASTE. When discarded in its purchased form, this product would not be regulated as a RCRA hazardous waste under 40 CFR 261.
SECTION 14: TRANSPORT INFORMATION: DOT/IATA/IMDG/TDG: Not Regulated
SECTION 15: REGULATORY INFORMATION:
OCCUPATIONAL SAFETY AND HEALTH ACT (OSHA): This product is not classified as hazardous under the criteria of the U.S. Occupational Safety and Health Administration (OSHA) Hazard Communication Standard, 29 CRF 1910.1200.
SARA TITLE III: SECTION 304—CERCLA: Reportable quantities have NOT been established for any of this product's components.
SARA TITLE III: SECTION 311/312—HAZARD COMMUNICATION STANDARD (HCS): This product does not contain Section 313 reportable ingredients.
TSCA SECTION 8(b)—INVENTORY STATUS: All components of this product are listed on or are exempt from the U.S. Toxic Substances Control Act (TSCA) Inventory.
TSCA SECTION 12(b) EXPORT NOTIFICATION: This product does not contain any components that are subject to the U.S. Toxic Substance Control Act (TSCA) Section 12(b) Export Notification Requirements.
CALIFORNIA PROPOSITION 65: This product is not known to contain any chemicals listed by the State of California (Safe Drinking Water and Toxic Enforcement Act of 1986) to cause cancer or reproductively toxicity.
CANADIAN INVENTORY STATUS: The components of this product are included on the Canadian Domestic Substance (DSL) or are exempt from DSL requirements.
CANADIAN WHMIS: This product is not classified as a controlled material under the Canadian Workplace Hazardous Material Information System.
ADDITIONAL CANADIAN REGULATORY INFORMATION: This product does not contain a substance present on the WHMIS Ingredient Disclosure List (IDL) which is at or above the specified concentration limit.

What is claimed is:
1. A biodegradable adhesive, comprising:
   a) 30.43%±10% of water;
   b) 0.67%±10% of defoamer;
   c) 13.50%±10% of gelatin;
   d) 0.40%±10% preservative;
   e) 12.00%±10% of a mixture of glycerin and sorbitol;
   f) 2.00%±10% of NaCl; and
   g) 41.00%±10% of sugar.
2. The biodegradable adhesive of claim 1, wherein the biodegradable adhesive comprises:
   a) 30.43%±5% of water;
   b) 0.67%±5% of defoamer;
   c) 13.50%±5% of gelatin;
   d) 0.40%±5% of preservative;
   e) 12.00%±5% of a mixture of glycerin and sorbitol;
   f) 2.00%±5% of NaCl; and
   g) 41.00%±5% of sugar.
3. The biodegradable adhesive of claim 2, wherein the biodegradable adhesive comprises:
   a) 30.43%±2% of water;
   b) 0.67%±2% of defoamer;
   c) 13.50%±2% of gelatin;
   d) 0.40%±2% of preservative;
   e) 12.00%±2% of a mixture of glycerin and sorbitol;
   f) 2.00%±2% of NaCl; and
   g) 41.00%±2% of sugar.
4. A method of using a biodegradable pressure sensitive adhesive, comprising: providing the biodegradable pressure sensitive adhesive of claim 1; and applying the biodegradable pressure sensitive adhesive to a substrate.
5. A biodegradable adhesive, comprising:
   a) 30.43%±10% of water;
   b) 0.67%±10% of defoamer;
   c) 13.50%±10% of gelatin;
   d) 0.40%±10% preservative;
   e) 12.00%±10% of glycerin;
   f) 2.00%±10% of NaCl; and
   g) 41.00%±10% of sugar.
6. The biodegradable adhesive of claim 5, wherein the biodegradable adhesive comprises:
   a) 30.43%±5% of water;
   b) 0.67%±5% of defoamer;
   c) 13.50%±5% of gelatin;
   d) 0.40%±5% of preservative;
   e) 12.00%±5% of glycerin;
   f) 2.00%±5% of NaCl; and
   g) 41.00%±5% of sugar.
7. The biodegradable adhesive of claim 6, wherein the biodegradable adhesive comprises:
   a) 30.43%±2% of water;
   b) 0.67%±2% of defoamer;
   c) 13.50%±2% of gelatin;
   d) 0.40%±2% of preservative;
   e) 12.00%±2% of glycerin;
   f) 2.00%±2% of NaCl; and
   g) 41.00%±2% of sugar.
8. A method of using a biodegradable pressure sensitive adhesive, comprising: providing the biodegradable pressure sensitive adhesive of claim 5; and applying the biodegradable pressure sensitive adhesive to a substrate.

9. A biodegradable adhesive, comprising:
  a) 30.43%±10% of water;
  b) 0.67%±10% of defoamer;
  c) 13.50%±10% of gelatin;
  d) 0.40%±10% preservative;
  e) 12.00%±10% of sorbitol;
  f) 2.00%±10% of NaCl; and
  g) 41.00%±10% of sugar.

10. The biodegradable adhesive of claim 9, wherein the biodegradable adhesive comprises:
  a) 30.43%±5% of water;
  b) 0.67%±5% of defoamer;
  c) 13.50%±5% of gelatin;
  d) 0.40%±5% of preservative;
  e) 12.00%±5% of sorbitol;
  f) 2.00%±5% of NaCl; and
  g) 41.00%±5% of sugar.

11. The biodegradable adhesive of claim 10, wherein the biodegradable adhesive comprises:
  a) 30.43%±2% of water;
  b) 0.67%±2% of defoamer;
  c) 13.50%±2% of gelatin;
  d) 0.40%±2% of preservative;
  e) 12.00%±2% of sorbitol;
  f) 2.00%±2% of NaCl; and
  g) 41.00%±2% of sugar.

12. A method of using a biodegradable pressure sensitive adhesive, comprising: providing the biodegradable pressure sensitive adhesive of claim 9; and applying the biodegradable pressure sensitive adhesive to a substrate.

* * * * *